(12) United States Patent
Truong et al.

(10) Patent No.: US 12,147,447 B2
(45) Date of Patent: *Nov. 19, 2024

(54) SYSTEMS AND METHODS FOR FORMATTING DATA USING A RECURRENT NEURAL NETWORK

(71) Applicant: Capital One Services, LLC, McLean, VA (US)

(72) Inventors: Anh Truong, Champaign, IL (US);
Reza Farivar, Champaign, IL (US);
Austin Walters, Savoy, IL (US);
Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,166

(22) Filed: Jun. 23, 2023

(65) Prior Publication Data
US 2023/0334063 A1    Oct. 19, 2023

Related U.S. Application Data

(63) Continuation of application No. 17/833,147, filed on Jun. 6, 2022, now Pat. No. 11,727,031, which is a (Continued)

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/9024* (2019.01); *G06F 17/18* (2013.01); *G06N 3/045* (2023.01); *G06N 3/047* (2023.01)

(58) Field of Classification Search
CPC ............... G06F 16/1794; G06F 16/258; G06F 16/9024; G06F 17/18; G06N 3/044;
(Continued)

(56) References Cited

U.S. PATENT DOCUMENTS 9,213,944 B1    12/2015  Do et al.
9,830,315 B1    11/2017  Xiao et al.
(Continued)

FOREIGN PATENT DOCUMENTS

WO    WO-2016/145379 A1    9/2016
WO    WO-2019124724 A1 *   6/2019 ............. G06F 17/18

OTHER PUBLICATIONS

English translation of WO-2019124724-A1. (Year: 2019).*

*Primary Examiner* — Diedra McQuitery
(74) *Attorney, Agent, or Firm* — Finnegan, Henderson, Farabow, Garrett & Dunner LLP

(57) ABSTRACT

Systems and methods for formatting data are disclosed. For example, a system may include at least one memory storing instructions and one or more processors configured to execute the instructions to perform operations. The operations may include receiving data comprising a plurality of sequences of data values and training a recurrent neural network model to output conditional probabilities of subsequent data values based on preceding data values in the data value sequences. The operations may include generating conditional probabilities using the trained recurrent neural network model and the received data. The operations may include determining a data format of a subset of the data value sequences, based on the generated conditional probabilities, and reformatting at least one of the data value sequences according to the determined data format.

20 Claims, 7 Drawing Sheets

Related U.S. Application Data continuation of application No. 17/078,775, filed on Oct. 23, 2020, now Pat. No. 11,360,996, which is a continuation of application No. 16/810,230, filed on Mar. 5, 2020, now Pat. No. 10,853,385.

(51) Int. Cl.
*G06F 16/901* (2019.01)
*G06F 17/18* (2006.01)
*G06N 3/045* (2023.01)
*G06N 3/047* (2023.01)

(58) Field of Classification Search
CPC ........ G06N 3/045; G06N 3/047; G06N 3/082; G06N 7/01
See application file for complete search history.

(56) References Cited

U.S. PATENT DOCUMENTS

| | | | |
|---|---|---|---|
| 10,388,272 B1 | 8/2019 | Thomson et al. | |
| 2004/0205474 A1* | 10/2004 | Eskin | H04L 63/1416 |
| | | | 713/188 |
| 2016/0342737 A1* | 11/2016 | Kaye | G16B 20/10 |
| 2017/0124447 A1 | 5/2017 | Chang et al. | |
| 2018/0082208 A1* | 3/2018 | Cormier | G06N 5/048 |
| 2018/0174671 A1 | 6/2018 | Cruz Huertas et al. | |
| 2019/0260787 A1 | 8/2019 | Zou | |
| 2020/0104361 A1 | 4/2020 | Zarrella | |
| 2020/0118035 A1 | 4/2020 | Asawa et al. | |
| 2020/0160178 A1 | 5/2020 | Kar et al. | |
| 2021/0019309 A1* | 1/2021 | Yadav | G06F 16/2428 |
| 2021/0074039 A1 | 3/2021 | Kholodkov et al. | |
| 2021/0089375 A1* | 3/2021 | Ghafourifar | G06F 9/453 |

\* cited by examiner

SYSTEMS AND METHODS FOR FORMATTING DATA USING A RECURRENT NEURAL NETWORK

CROSS-REFERENCE TO RELATED APPLICATION

This is a continuation of application Ser. No. 17/833,147, filed Jun. 6, 2022, which is a continuation of Ser. No. 17/078,775, filed Oct. 23, 2020, which issued as U.S. Pat. No. 11,360,996 on Jun. 14, 2022, which is a continuation of application Ser. No. 16/810,230, filed Mar. 5, 2020, which issued as U.S. Pat. No. 10,853,385 on Dec. 1, 2020. The disclosures of the above-mentioned applications are incorporated herein by reference in their entireties.

BACKGROUND

Systems and methods to determine a data format and/or reformat data are needed in many fields, including data management, science, finance, engineering, environmental monitoring, water supply systems, climate studies, health care, and other areas. Data may exhibit formats that vary from one data entry to another, and standardized data may be desired. For example, a date could be expressed as "Jan. 1, 2019" or as "1/1/2019." A phone number may be expressed as "(555) 567-8901" or as "+1-555-567-8901." Symbols providing instructions may be given in various orders (e.g., symbols to communicate a set of care instructions for clothing). Often, a data format may need to be identified and/or data may need to be reformatted according to a standard format.

Conventional approaches may include using rule-based algorithms to determine a data format. Problems arise in conventional approaches when encountering data of unknown formats. For example, a rule-based approach may fail to recognize an international phone number format that includes extra digits or fail to recognize a previously unencountered date format that inverts month and day. Rule-based methods for determining data formats may therefore require additional human input to adjust and complex algorithms to classify data. Thus, rule-based methods may be inflexible, labor intensive, require advance knowledge, and/or require large amounts of computing resources to implement complex algorithms.

Often, data includes sequences of data values (data value sequences) that follow a pattern (i.e., data format), including the examples of phone numbers provided above. As a system reads a data value sequence, the conditional probability that a particular data value may appear later in sequence can change. For example, a closing parenthesis may have high conditional probability after reading the characters (555 in a data sequence but have low conditional probability after reading in a 1-555 in a data value sequence. Further, specific data values or sub-sequences of data values may relate to later data values. For example, the area code 555 and exchange 408 may be correlated in a dataset that has many numbers with a format 555-408-DDDD, To increase the efficiency of determining data formats when processing large amounts of data, conditional probabilities, which may reflect relationships between data values, may be helpful in efficiently determining data formats. To continue the previous example, in some datasets, a data format may be predicted as 555-408-DDDD by reading only 555-4. However, conditional probabilities of data value sequences may be based on complex underlying relationships between data values, and data value sequences may have a variety of data formats. Conventional approaches for reformatting data often may be unable to account for these complex relationships and unable to efficiently identify data formats.

Synthetic data generation may benefit from improved methods of determining data formats. For example, in order to protect confidentiality, among other reasons, it may be desired to generate a synthetic data that is similar to another dataset. But synthetic data generation models may be unable to generate such synthetic data when data formats are unknown, or models may discard training data when data formats are unknown, leading to suboptimal synthetic data (e.g., synthetic data that does not closely mimic real world data).

In view of the shortcomings and problems with conventional approaches to formatting data, there is a need for approaches that can efficiently and effectively determine data formats, thereby providing advantages over prior solutions by reducing the need for labor, advance knowledge, and computing resources.

SUMMARY

The disclosed embodiments provide unconventional methods and systems for determining a data format and/or reformatting data. Embodiments consistent with the present disclosure are rooted in computer technology and may include using conditional probabilities in data value sequences to determine data formats. Further, embodiments may include using machine learning models to determine data formats based on learned conditional probabilities. This approach is advantageous over the conventional approach because, among other reasons, this approach may result in faster data processing times and the ability to process data of unknown data format without recoding by humans. The embodiments provide advantages by increasing accuracy and reducing resource use when determining conditional probabilities and data formats. In some cases, using machine learning models may be more memory efficient than conventional approaches. Moreover, machine learning models may be more flexible than conventional approaches because a model may be updated without needing to store large datasets comprising conditional probabilities. Further, disclosed embodiments provide methods of validating machine learning models that determine data formats, thereby providing increased confidence and creating opportunities to retrain models to improve accuracy.

Consistent with the present embodiments, a system for formatting data is disclosed. The system may include at least one memory storing instructions and one or more processors configured to execute the instructions to perform operations. The operations may include receiving data comprising a plurality of sequences of data values and training a recurrent neural network model to output conditional probabilities of subsequent data values based on preceding data values in the data value sequences. The operations may include generating conditional probabilities using the trained recurrent neural network model and the received data. The operations may include determining a data format of a subset of the data value sequences, based on the generated conditional probabilities, and reformatting at least one of the data value sequences according to the determined data format.

Consistent with the present embodiments, a method for formatting data may be disclosed. The method may include receiving data comprising a plurality of sequences of data values and training a recurrent neural network model to output conditional probabilities of subsequent data values based on preceding data values in the data value sequences. The operations may include generating conditional probabilities using the trained recurrent neural network model and the received data. The operations may include determining a data format of a subset of the data value sequences, based on the generated conditional probabilities, and reformatting at least one of the data value sequences according to the determined data format.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Consistent with disclosed embodiments, systems and methods for formatting data are disclosed. As explained above, disclosed systems and methods provide accuracy, efficiency, and cost advantages over conventional approaches.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
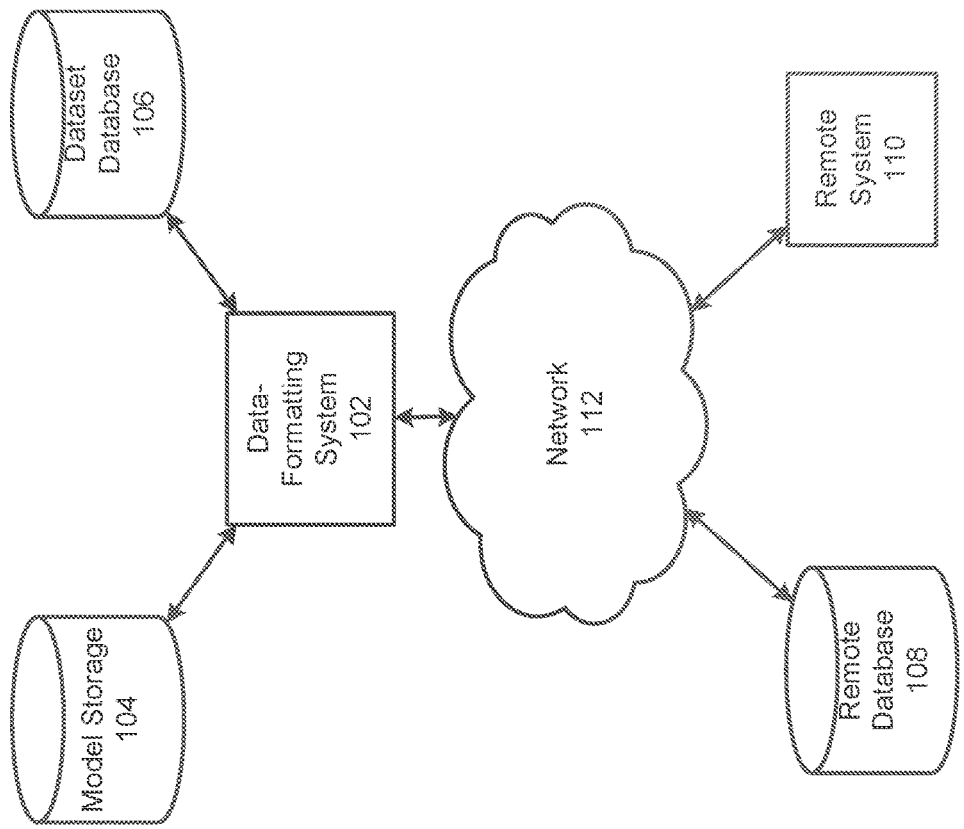
FIG. 1 is a block diagram of an exemplary system for detecting data formats, consistent with disclosed embodiments.

FIG. 1 is a block diagram of an exemplary system 100 for formatting data, consistent with disclosed embodiments. As shown, system 100 may include a data-formatting system 102, a model storage 104, a dataset database 106, a remote database 108, and a remote system 110. Some or all components of system 100 may be connected to each other via a network 112.

In some embodiments, aspects of system 100 may be implemented on one or more cloud services designed to generate ("spin-up") ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals and/or remote shell tools like SSH, RTP, FTP, and/or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of data-formatting systems, dataset database, model storages, remote databases, remote systems, and/or networks. In addition, system 100 may further include other components and/or devices not depicted that perform and/or assist in the performance of one or more processes, consistent with the disclosed embodiments. The exemplary components and arrangements shown in FIG. 1 are not intended to limit the disclosed embodiments.

Data-formatting system 102 may include a computing device, a computer, a server, a server cluster, a plurality of server clusters, and/or a cloud service, consistent with disclosed embodiments. Data-formatting system 102 may include at least one memory and one or more processors configured to perform operations consistent with disclosed embodiments. Data-formatting system 102 may include computing systems configured to generate, receive, retrieve, store, and/or provide data models and/or datasets, consistent with disclosed embodiments. Data-formatting system 102 may include computing systems configured to generate and train models, consistent with disclosed embodiments. Data-formatting system 102 may be configured to receive data from, retrieve data from, and/or transmit data to other components of system 100 and/or computing components outside system 100 (e.g., via network 112). Data-formatting system 102 is disclosed in greater detail below (in reference to FIG. 2).

Model storage 104 may be hosted on one or more servers, one or more clusters of servers, or one or more cloud services. Model storage 104 may be connected to network 112 (connection not shown). In some embodiments, model storage 104 may be a component of data-formatting system 102 (not shown).

Model storage 104 may include one or more databases configured to store data models (e.g., machine-learning models or statistical models) and descriptive information of data models. Model storage 104 may be configured to provide information regarding available data models to a user or another system. Databases may include cloud-based databases, cloud-based buckets, or on-premises databases. The information may include model information, such as the type and/or purpose of a model and any measures of classification error. Model storage 104 may include one or more databases configured to store indexed and clustered models for use by data-formatting system 100. For example, model storage 104 may store models associated with generalized representations of those models (e.g., neural network architectures stored in TENSORFLOW or other standardized formats). Databases may include cloud-based databases (e.g., AMAZON WEB SERVICES RELATIONAL DATABASE SERVICE) or on-premises databases.

Dataset database 106 may include one or more databases configured to store data for use by system 100, consistent with disclosed embodiments. In some embodiments, dataset database 106 may be configured to store datasets and/or one or more dataset indexes, consistent with disclosed embodiments. Dataset database 106 may include a cloud-based database (e.g., AMAZON WEB SERVICES RELATIONAL DATABASE SERVICE) or an on-premises database. Dataset database 106 may include datasets, model data (e.g., model parameters, training criteria, performance metrics, etc.), and/or other data, consistent with disclosed embodiments. Dataset database 106 may include data received from one or more components of system 100 and/or computing components outside system 100 (e.g., via network 112). In some embodiments, dataset database 106 may be a component of data-formatting system 102 (not shown).

Remote database 108 may include one or more databases configured to store data for use by system 100, consistent with disclosed embodiments. Remote database 108 may be configured to store datasets and/or one or more dataset indexes, consistent with disclosed embodiments. Remote database 108 may include a cloud-based database (e.g., AMAZON WEB SERVICES RELATIONAL DATABASE SERVICE) or an on-premises database.

Remote system 110 may include at least one memory and one or more processors configured to perform operations consistent with disclosed embodiments. In some embodiments, remote system 110 may be or include a virtual private cloud, a local computing environment (e.g., a personal computer, terminal, kiosk, or workstation), a server, a server cluster, a device (e.g., a mobile device, a tablet, a laptop, etc.), and/or any other computing system. In some embodiments, remote system 110 may be unconnected to other computing systems except via network 112.

Remote system 110 may include one or more memory units and one or more processors configured to perform operations consistent with disclosed embodiments. In some embodiments, remote system 110 may include hardware, software, and/or firmware modules. Remote system 110 may be a user device. Remote system 110 may include a mobile device, a tablet, a personal computer, a terminal, a kiosk, a server, a server cluster, a cloud service, a storage device, a specialized device configured to perform methods according to disclosed embodiments, or the like. In some embodiments, remote system 110 may include one or more components as described in reference to data-formatting system 102 (FIG. 2).

Remote system 110 may provide data to data-formatting system. For example, remote system 110 may provide training data to data-formatting system 102 and/or a machine learning model, consistent with disclosed embodiments. In some embodiments, remote system 110 provides data to data-formatting system via a subscription, a feed, a socket, or the like. In some embodiments, remote system 110 sends a request to remote system to retrieve data. In some embodiments, remote system 110 sends a request to data-formatting system for formatted data, synthetic data, and/or one or more models configured to format data.

Network 112 may be a public network or private network and may include, for example, a wired or wireless network, including, without limitation, a Local Area Network, a Wide Area Network, a Metropolitan Area Network, an IEEE-standard-compliant wireless network (e.g., "Wi-Fi"), a network of networks (e.g., the Internet), a land-line telephone network, or the like. Network 112 may be connected to other networks (not depicted in FIG. 1) to connect the various system components to each other and/or to external systems or devices. In some embodiments, network 112 may be a secure network and require a password to access the network.

Figure 2:
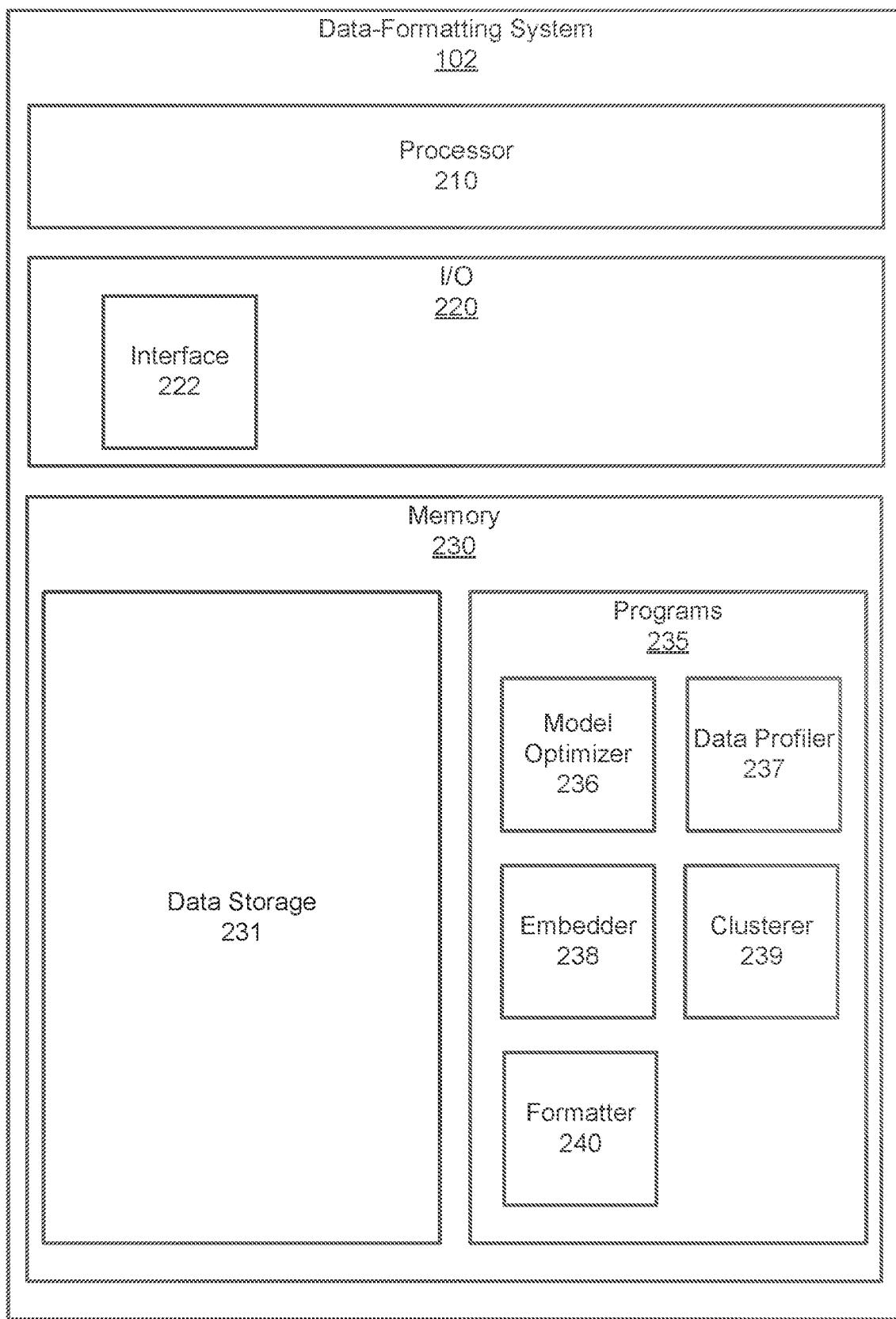
FIG. 2 is a block diagram of an exemplary data-formatting system, consistent with disclosed embodiments.

FIG. 2 is a block diagram of exemplary data-formatting system 102, consistent with disclosed embodiments. Data-formatting system 102 may include a computing device, a computer, a server, a server cluster, a plurality of clusters, and/or a cloud service, consistent with disclosed embodiments. As shown, data-formatting system 102 may include one or more processors 510, one or more I/O devices 520, and one or more memory units 530. In some embodiments, some or all components of data-formatting system 102 may be hosted on a device, a computer, a server, a cluster of servers, or a cloud service. In some embodiments, data-formatting system 102 may be a scalable system configured to efficiently manage resources and enhance security by provisioning computing resources in response to triggering events and terminating resources after completing a task (e.g., a scalable cloud service that spins up and terminates container instances).

FIG. 2 depicts an exemplary configuration of data-formatting system 102. As will be appreciated by one skilled in the art, the components and arrangement of components included in data-formatting system 102 may vary. For example, as compared to the depiction in FIG. 2, data-formatting system 102 may include a larger or smaller number of processors, I/O devices, or memory units. In addition, data-formatting system 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may comprise known computing processors. In some embodiments, processor 210 may include a microprocessor. Processor 210 may comprise a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 230 to perform various functions of the disclosed embodiments described in greater detail below. Processor 210 may be configured to execute functions written in one or more known programming languages.

In data-formatting system 102, an input/output (I/O) section 220 may include at least one of a display, an LED, a router, a touchscreen, a keyboard, a microphone, a speaker, a haptic device, a camera, a button, a dial, a switch, a knob, a transceiver, an input device, an output device, or other input/output device to perform methods of the disclosed embodiments. I/O section 220 may comprise an interface 222 (e.g., a user interface).

Interface 222 may be configured to manage interactions between system 100 and other systems using network 112. In some aspects, interface 222 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 222 may be configured to provide information received from other components of system 100 regarding datasets. In various aspects, interface 222 may be configured to provide data or instructions received from other systems to components of system 100. For example, interface 222 may be configured to receive instructions for generating data models (e.g., instructions identifying a type of data model, data model parameters, training data indicators, training parameters, or the like) from another system and provide this information to programs 235. As an additional example, interface 222 may be configured to receive data including sensitive data from another system (e.g., in a file, a message in a publication and subscription framework, a network socket, or the like) and provide that data to programs 235 or store that data in, for example, data storage 231, model storage 104, dataset database 106, and/or remote database 108.

In some embodiments, interface 222 may include a user interface configured to receive user inputs and provide data to a user (e.g., a data manager). For example, interface 222 may include a display, a microphone, a speaker, a keyboard, a mouse, a track pad, a button, a dial, a knob, a printer, a light, an LED, a haptic feedback device, a touchscreen and/or other input or output devices.

Memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data storage 231, storing at least one of encrypted data or unencrypted data. Consistent with disclosed embodiments, data storage 231 may include datasets, model data (e.g., model parameters, training criteria, performance metrics, etc.), and/or other data.

Programs 235 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 235 may be written in one or more programming or scripting languages. One or more of such software sections or modules of memory 230 may be integrated into a computer system, non-transitory computer-readable media, or existing communications software. Programs 235 may also be implemented or replicated as firmware or circuit logic.

Programs 235 may include a model optimizer 236, a data profiler 237, an embedder 238, a clusterer 239, a formatter 240 and/or other components (e.g., modules) not depicted to perform methods of the disclosed embodiments. In some embodiments, components of programs 235 may be configured to generate ("spin up") one or more ephemeral container instances (e.g., an AMAZON LAMBDA instance) to perform a task and/or to assign a task to a running (warm) container instance, consistent with disclosed embodiments. Components of programs 235 may be configured to receive, retrieve, and/or generate models, consistent with disclosed embodiments. Modules of programs 235 may be configured to perform operations in coordination with one another. In some embodiments, programs 235 may be configured to conduct an authentication process. In some embodiments, model optimizer 236, a data profiler 237, an embedder 238, a clusterer 239, a formatter 240 and/or other components may include programs to manage and direct steps of process 400 and/or 600, as described below (e.g., programs to send and receive commands to and from other components of system 100, within data-formatting system 102, and/or outside system 100).

Model optimizer 236 may include programs (e.g., scripts, functions, algorithms) to train, implement, store, receive, retrieve, and/or transmit one or more machine-learning models. Machine-learning models may include a neural network model, an attention network model, a generative adversarial network (GAN) model, a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Model optimizer 236 may be configured to adjust model parameters during training. Model parameters may include weights, coefficients, offsets, or the like. Training may be supervised or unsupervised.

Model optimizer 236 may be configured to train machine learning models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 236 may be configured to optimize statistical models using known optimization techniques.

In some embodiments, model optimizer 236 may be configured to generate models based on instructions received from another component of system 100 and/or a computing component outside system 100 (e.g., via interface 222, from client device 110, etc.). For example, model optimizer 236 may be configured to receive a visual (e.g., graphical) depiction of a machine learning model and parse that graphical depiction into instructions for creating and training a corresponding neural network. Model optimizer 236 may be configured to select model training parameters. This selection can be based on model performance feedback received from another component of system 100. Model optimizer 236 may be configured to provide trained models and descriptive information concerning the trained models to model storage 104.

Model optimizer 236 may be configured to train data models to generate synthetic data based on an input dataset (e.g., a dataset comprising actual data and/or a dataset reformatted according to a determined data format as disclosed herein). For example, model optimizer 236 may be configured to train data models to generate synthetic data by identifying and replacing sensitive information in a dataset. In some embodiments, model optimizer 236 may be configured to train data models to generate synthetic data based on a data profile (e.g., a data schema and/or a statistical profile of a dataset). For example, model optimizer 236 may be configured to train data models to generate synthetic data to satisfy a performance criterion. Performance criteria may be based on a similarity metric representing a measure of similarity between a synthetic dataset and another dataset.

Data profiler 237 may include algorithms to determine a data schema of a dataset. A data schema (i.e., structure) may include a data type, key-value pair, label, metadata, field, relationship, view, index, package, procedure, function, trigger, sequence, synonym, link, directory, queue, or the like.

Data profiler 237 may be configured to determine foreign keys of a dataset, i.e., data elements that appear in multiple datasets and may be used to cross-reference data and determine relationships between datasets. Foreign keys may be unique (e.g., a personal identifier) or shared (e.g., a postal code).

In some embodiments, data profiler 237 may be configured to implement univariate and multivariate statistical methods. Data profiler 237 may include a regression model, a Bayesian model, a statistical model, a linear discriminant analysis model, or other model configured to determine one or more descriptive metrics of a dataset. For example, data profiler 237 may include algorithms (e.g., a data-profiling model or other model) to determine an average, a mean, a standard deviation, a quantile, a quartile, a probability distribution function, a range, a moment, a variance, a covariance, a covariance matrix, a similarity metric, a dimension and/or dimensional relationship (e.g., as produced by dimensional analysis such as length, time, mass, etc.) or any other descriptive metric of a dataset. In some embodiments, data profiler 237 may be configured to generate a similarity metric representing a measure of similarity between data within a dataset and/or data in different datasets. A similarity metric may be based on a correlation, covariance matrix, a variance, a frequency of overlapping values, or other measure of statistical similarity). In some embodiments, data profiler 237 may be configured to return a statistical profile of a dataset, the statistical profile including a plurality of descriptive metrics. In some embodiments, data profiler 237 may be configured to output a data profile, the data profile comprising a statistical profile and information describing a data schema such as a vectorized representation of a data schema, meta-data, etc.

Embedder 238 may be configured to encode data and/or to embed data, consistent with disclosed embodiments. Encoding data may include converting raw data into a pre-determined format, such as converting strings to a numeric format. Encoding may include mapping from a character to an index, such as a one hot-encoding. It should be understood that the examples of encoding provided herein are not limiting on the embodiments. Embodiments may include still other methods of encoding.

Embedding data may include a principal component analysis (PCA), an independent component analysis (ICA), a non-negative matrix factorization method (NMF), a Factor Analysis (FA), and/or any other algorithm to reduce dimensionality of data. Embedder 238 may include machine learning models configured to embed data. Embedder 238 may include algorithms to return one or more vector representations of showing relationships between raw data, including, for example, a word2vec method, a GloVe (Global Vector) method, a transformer method (e.g., a Bidirectional Encoder Representations from Transformer (BERT) method), an Embeddings from Language Models (ELMo) method, PCA, and/or any other method to obtain vector representation for data. More generally, embedding may include implementing algorithms (e.g., models) to transform data into an n-dimensional space, where the number of dimensions (n) may vary. Dimensions may be based on relationships among input data. Embedder 238 may include one or more embedding layers (i.e., one or more embedding algorithms that embed data in series and/or in parallel). An embedding network layer may include a natural language processing model, a binary classification model, a convolutional neural network model, a deep learning model, a transformer model (e.g., a BERT model), an ELMo representation model, and/or any other model configured to embed data.

Clusterer 239 may be configured to classify data. Classifying data may include determining whether a data sample is related to another data sample. Classifying a dataset may include clustering datasets and generating information indicating whether a dataset belongs to a cluster of datasets. In some embodiments, classifying a dataset may be based on a data profile, a data schema, a statistical profile, a foreign key, a similarity metric, a relationship between datasets (e.g., node and edge data), and/or other descriptive information. For example, clusterer 239 may be configured to classify a dataset based on a statistical profile of a distribution of activation function values of a neural network. Clusterer 239 may be configured to classify a dataset based on data received from data profiler 237.

Clusterer 239 may be configured to cluster datasets, i.e., to group datasets that may share common features, such as overlapping data, shared statistical properties, etc. Clustered datasets may share hierarchical relationships (i.e., data lineage). Edge data may be based on a similarity metric. Edge data may indicate a similarity between datasets and/or a hierarchical relationship (e.g., a data lineage, a parent-child relationship). In some embodiments, clustering may include generating graphical data, such as a node diagram, a tree diagram, or a vector diagram of datasets. Clustering may include estimating a likelihood that a dataset relates to another dataset, the likelihood being based on the similarity metric.

Clusterer 239 may be configured to receive, generate, train, and/or implement a model for classifying or clustering data, consistent with disclosed embodiments. For example, clusterer 239 may be configured to perform methods disclosed in reference to model optimizer 236 and/or may be configured to send instructions to model optimizer 236.

Formatter 240 may include algorithms to determine a data format. In some embodiments, formatter 240 may be configured to determine a data format associated with a data value sequence, such as a sequence of digits representing a phone number. As additional examples, formatter 240 may be able to determine a format of an address, an identification number, a transaction number, a label, an account number, a credit card number, a date, a product number, and/or any other text. A format may include a sequence of data types of a data value sequence. A format may include a sequence of sequences (e.g., phone number format may comprise a sequence of three numbers representing an area code, three numbers representing an exchange, and four numbers representing an extension). Consistent with disclosed embodiments, formatter 240 may be configured to determine a format of any sequence of data, including a sequence of images, a sequence of shape data, a sequence of symbols, etc.

As an illustrative example, formatter 240 may determine a format of a sequence of images representing laundry instructions specifying a wash water temperature, a dryer setting, a dry cleaning method, an ironing setting, and the like. In the example, formatter 240 may receive a sequence of encoded image data from embedder 239 based on the images representing laundry instructions. Formatter 240 may be configured to determine a format of the embedded data, the format including an order of laundry instructions (e.g., first washing instructions, then drying instructions, then ironing instructions). Similarly, formatter 240 may determine a format of a sequence of symbols or images representing assembly instructions, software installation instructions, cooking instructions, fire safety instructions, emergency exit instructions, etc. As one of skill in the art will appreciate, disclosed systems and methods may be used to determine formats of any sequence of values of any type of data, and embodiments are not limited to the examples provided herein.

In some embodiments, formatter 240 may receive data of an unknown format and determine a data format. For example, formatter 240 may receive character data describing phone numbers of unknown format and determine that that data includes the following formats, where "d" represents a digit: (ddd) ddd-dddd; d-ddd-ddd-dddd; ddddddddd, etc. In some embodiments, formatter 240 may be configured to compare data of unknown format to data of a known format to determine a data format. For example, formatter 240 may perform a lookup in a table of known formats. In some embodiments, formatter 240 includes an expression to determine a data format. For example, formatter 240 may include a regex expression to return a binary value indicating whether data has a specified format.

In some embodiments, formatter 240 may be configured to return conditional probabilities associated with a data value sequence. As an example, given a sequence of characters corresponding to a date, formatter 240 may be configured to determine the conditional probability that the second character in the sequence of characters is a "u" given that the first character is a "J." As another example, formatter 240 may be configured to determine the probability that a fourth character in a sequence of values representing a phone number is a ")" given that the first character is a "(". As another illustrative example, for some 16-digit credit card numbers digits 2-6 may be associated with an issuing bank of which there may be a limited pool of issuing banks and, consequently, some sequences of digits 2-6 will have higher frequencies of occurrence in a dataset than other sequences. Formatter 240 may be configured to determine a probability of digits 5 and 6 having certain values based on the values of digits 2 and 3. Further examples of conditional probabilities are provided in greater detail below in relation to FIG. 3.

In some embodiments, formatter 240 may be configured to generate a graphical representation of conditional probabilities (e.g., as described later in relation to FIG. 5). Formatter 240 may be configured to store and/or index conditional probabilities as a structured dataset capable of being displayed as a structured diagram, such as a network diagram, a tree, etc. Formatter 240 may be configured to generate a direct conditional-probability graph and/or a modeled conditional-probability graph, consistent with disclosed embodiments.

Formatter 240 may include an RNN, a deep learning model, and/or any other machine learning model trained to generate conditional probabilities, consistent with disclosed embodiments. Formatter 240 may include an expression and/or a rule-based algorithm configured to determine conditional probabilities. For example, formatter 240 may include an expression that, when executed, determines a data format by analyzing frequencies of occurrence of different sequences of data values. Formatter 240 may be configured to train a model to determine conditional probabilities.

In some embodiments, formatter 240 may be configured to reformat (i.e., rewrite) data according to a data format. For example, formatter 240 may receive data having a first format and reformat the data according to a second format. As an illustrative example, formatter 240 may receive a phone number formatted as 5555678901 and reformat the phone number as (555) 567-8901. Reformatting may include inserting, prepending, appending, deleting, truncating, and/or otherwise modifying data values in a data value sequence. For example, the phone number 1-555-567-8901 may be reformatted as (555) 567-8901 such that the phone number may be truncated to exclude the leading "1"; an opening parenthesis, a closing parenthesis, and a space may be inserted into the phone number; and a hyphen may be deleted from the phone number.

Figure 3:
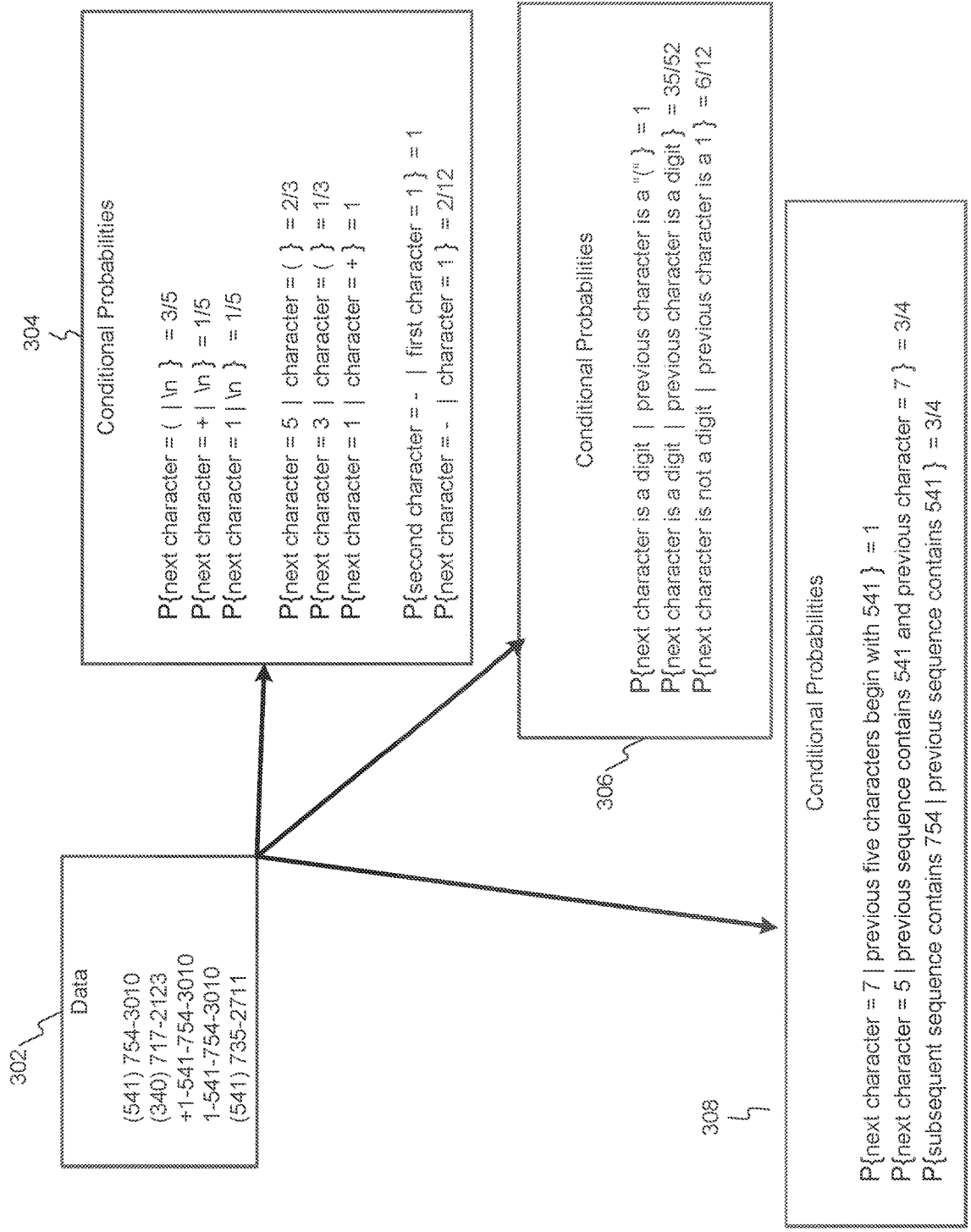
FIG. 3 illustrates exemplary conditional probabilities of sequences of data, consistent with disclosed embodiments.

FIG. 3 illustrates exemplary conditional probabilities of sequences of data, consistent with disclosed embodiments. FIG. 3 is provided for purposes of illustration only and is not limiting on the embodiments. Embodiments may include data formats and conditional probabilities that differ from those depicted in FIG. 3.

As shown, data 302 may include a plurality of phone numbers having different formats organized as a data column. Phone numbers of data 302 include data value sequences comprised of digits and special characters (e.g., parentheses, hyphens, spaces, plus signs). In the example of FIG. 3, conditional probabilities 304, 306, and 308 are based on data 302.

Conditional probabilities may include the probability of having a specific data value sequence. For example, conditional probabilities 304 may include:

$$P\{\text{next character}=(|\backslash n)\}=3/5,$$

which is intended to be read as the conditional probability "P" that the next character in a data value sequence is equal to an opening parenthesis "(" given a line break "\n" is equal to 3/5. This expression holds true because three of five example phone numbers in data 302 begin with an opening parenthesis. Similarly, in conditional probabilities 304, the conditional probability that a phone number begins with a plus sign "+" is 1/5, and the conditional probability that a phone number begins with a "1" is 1/5. Continuing with the example, conditional probabilities 304 includes the probability of having a "5" follow an opening parenthesis, a "3" follow an opening parenthesis, and the conditional probability of having a "1" following a plus sign, which are 2/3, 1/3, and 1, respectively.

A conditional probability may be based on a specific sequence at a specific position in a data value sequence such as a first character in a sequence, a second character in a sequence, etc. For example, conditional probabilities 304 includes the conditional probability of having a second character in a data value sequence be a hyphen given that a first character is a "1." Alternatively or additionally, a conditional probability may be based on a specific sequence at any position in a data value sequence. For example, in conditional probabilities 304, the conditional probability of having a hyphen following a "1" is 2/12 because there are twelve digit "1"s in data 302, of which two are followed by a hyphen.

In some embodiments, conditional probabilities may be based on a data value type (e.g., whether a data value is a digit or a special character). For example, in FIG. 3, data value types may include digits, special characters, spaces, line breaks, etc. Conditional probabilities 306 includes the conditional probability that a digit (which is a data value type) follows an opening parenthesis (which is a specific data value of the special character data value type). As another example, conditional probabilities 306 includes the conditional probability that a digit follows a digit, which is 35/52 because there are 52 digits and 17 digits are followed by special characters, spaces, or line breaks in data 302. As yet another example, conditional probabilities 306 include the conditional probability that the next character is not a digit, given that the previous character is a 1, which is 6/12. As one of skill in the art will appreciate, embodiments may include conditional probabilities based on data value type other than those not depicted in FIG. 3.

As shown in FIG. 3, conditional probabilities of the embodiments may be based on complex relationships between data values in a sequence of data values, including relationships between nonconsecutive data values. Further, conditional probabilities of the embodiments may relate to a previous data value and/or data type, a next data value and/or data type, a previous subset of the data value sequence, and/or a subsequent subset of a data value sequence. As an example, conditional probabilities 308 includes the conditional probability that a next character is "7" given that the previous five characters begin with the digits "541." Similarly, conditional probabilities 308 includes the conditional probability that a next character is "5" given that the previous sequence contains the digits "541" and the previous character is "7." As yet another example, conditional probabilities 308 includes the conditional probability that a subsequent sequence contains the digits "754" given that the previous sequence contains "541."

As the examples of FIG. 3 suggest, conditional probabilities of the embodiments may be based on complex underlying relationships between data values, and data value sequences may have a variety of data formats. Thus, rule-based coding for determining data formats may be inflexible, labor intensive, require advance knowledge, and/or require large amounts of computing resources. Accordingly, disclosed embodiments may involve machine learning to efficiently and effectively identify conditional probabilities that can accurately determine data formats, thereby providing advantages over prior solutions by reducing the need for labor, advance knowledge, and computing resources.

Figure 4:
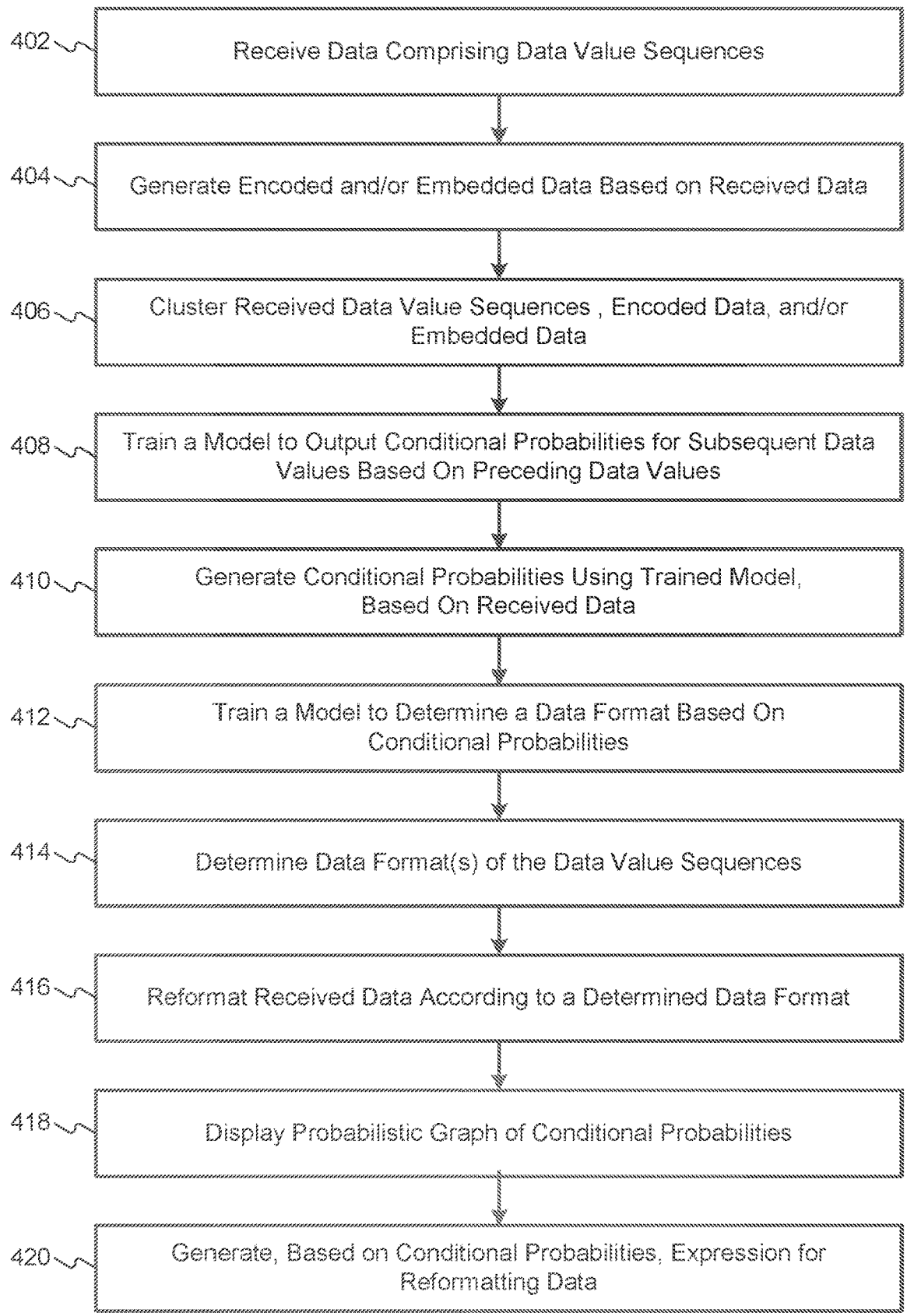
FIG. 4 is a flow chart of an exemplary data formatting process, consistent with disclosed embodiments.

FIG. 4 is a flow chart of an exemplary data formatting process, consistent with disclosed embodiments. In some embodiments, data-management system 102 may perform process 400 using programs 235. One or more of model optimizer 236, data profiler 237, embedder 238, clusterer 240, formatter 240 and/or other components of programs 235 may perform operations of process 400, consistent with disclosed embodiments. It should be noted that other components of system 100, including, for example, remote system 110 may perform operations of one or more steps of process 400. In some embodiments, one or more steps of process 400, process 600 (below), and process 700 may be part of a same process.

Consistent with disclosed embodiments, steps of process 400 may be performed on one or more cloud services using one or more ephemeral container instances (e.g., AMAZON LAMBDA). For example, at any of step of process 400, data-formatting system 102 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, data-formatting system 102 may receive data comprising data value sequences, consistent with disclosed embodiments. Receiving data may include receiving data from a component of system 100 and/or a computing component outside system 100. For example, receiving data may include receiving data from remote system 110, remote database 108, dataset database 106, model storage 104, memory 230, and/or any other data source. Received data may include one or more datasets, one or more files, column data, database data, and/or any other data. A data value sequence may include any data value sequence as described herein and/or any other data value sequence. Receiving data at step 402 may include receiving a request to determine one or more data formats, to reformat one or more data sequences, and/or to generate an expression to identify or format data.

At step 404, data-formatting system 102 may generate encoded and/or embedded data based on received data, consistent with disclosed embodiments. Step 404 may include using any embedding method and/or encoding method as disclosed in reference to embedder 238 and/or any other embedding or encoding method.

At step 406, data-formatting system 102 may cluster received data value sequences, cluster encoded data, and/or cluster embedded data, consistent with disclosed embodiments. Step 406 may include using any method of clustering data as disclosed in reference to clusterer 239 and/or any other method of clustering data.

At step 408, data-formatting system 102 may train a model to output conditional probabilities for subsequent data values based on preceding data values, consistent with disclosed embodiments, step 408 may include using any method of training a model as disclosed in reference to optimizer 236 and/or any other method of training a model. In some embodiments, a model of step 408 may include any machine learning model, including models described herein. In some embodiments, the model of step 408 is a recurrent neural network (RNN). Training data may include received data, encoded data, and embedded data. In some embodiments, step 408 may include determining conditional probabilities by calculating a frequency of occurrence (e.g., by counting a number of times a data value occurs in a data value sequence given a preceding data value). Step 408 may include training based on embedded or encoded data, consistent with disclosed embodiments. Step 408 may include training a respective model for a plurality of data clusters (e.g., clusters of step 406).

As an example, a model (e.g., an RNN model) may be trained to learn a relationship between sub-sequences in a data value sequence. For example, a model may be trained to learn that for sub-sequences that include area codes such as "(555)" (e.g., using a 5-character window), subsequent sub-sequences are highly likely to include seven additional numbers to complete a phone number. More generally, a model may learn conditional probabilities by using a moving window over data value sequences, over embedded data value sequences, and/or over encoded data value sequences, consistent with disclosed embodiments. Accordingly, a model may compare a sequence with a next sequence to learn a relationship of patterns. Learned information may be reflected in updates to internal states of a model (e.g., through changes to nodes of a neural network).

At step 410, data-formatting system 102 may generate conditional probabilities using a trained model, based on received data, consistent with disclosed embodiments. Conditional probabilities of step 410 may include any conditional probability as described herein and/or any other conditional probability (e.g., conditional probabilities as related to data values and/or data value types). The model of step 410 may be the same model as the model of step 408. In some embodiments, step 410 includes retrieving a trained model (e.g., retrieving a model from model storage 104).

In some embodiments, generating conditional probabilities at step 410 may involve extended calculation times to return conditional probabilities of rare patterns (i.e., rare data formats) in received data. A rare pattern may be one in which a frequency of occurrence is below a threshold, such as less than one in a hundred, one in a thousand, one in a million, or other threshold. In some embodiments, step 410 may include skipping a data value according to a timeout window. For example, if a model (e.g., an RNN model) does not return conditional probabilities of a pattern prior to a timeout window, data-formatting system 102 may discard one or more instances of data value sequences that include the pattern. In some embodiments, step 410 may include implementing a direct data-formatting method such as steps of process 700 to provide conditional probabilities for a skipped data value.

At step 412, data-formatting system 102 may train a model to determine a data format based on conditional probabilities, consistent with disclosed embodiments. Consistent with disclosed embodiments, conditional probabilities include a probability of having a subsequent data value based on a preceding data value. In some embodiments, training a model to determine a data format is based on a relationship between conditional probabilities and one or more data formats. For example, training data may include data labelled as having identified formats, and a model may be trained to predict identified data formats based on a correlation between conditional probabilities and identified data formats. In some embodiments, a relationship between conditional probabilities and a data format may include a correlation, a regression coefficient, and/or any other relationship. In some embodiments, a model of step 412 is trained to be provided conditional probabilities as an input and return data formats as output. Step 412 may include training based on embedded or encoded data, consistent with disclosed embodiments.

In some embodiments, step 412 is performed simultaneously with step 408 (i.e., a same model is trained to determine conditional probabilities and trained to determine a data format based on the conditional probabilities).

At step 414, data-formatting system 102 may determine one or more data formats of the data value sequences, consistent with disclosed embodiments. Step 414 may include implementing a model trained to determine data value sequences (e.g., a model of step 412 and/or a model previously trained and stored in, for example, model storage 104).

At step 416, data-formatting system 102 may reformat received data according to a determined data format, consistent with disclosed embodiments. As disclosed herein, reformatting may include inserting, prepending, appending, deleting, truncating, and/or otherwise modifying data values in a data value sequence. In some embodiments, a determined data format may include a format identified at step 414. In some embodiments, a determined data format may include a format identified in received data at step 408 as part of a request to reformat data.

In some embodiments, a determined data format of step 416 may be a selected format. For example, data-formatting system 102 may transmit one or more determined data formats to remote system 110 and receive a selected format from remote system 110. In some embodiments, data-formatting system 102 may display a determined data format at interface 222 and receive user inputs selecting a data format.

Step 416 may include training a synthetic data model to generate synthetic data based on reformatted data according to a determined data format. Model training may be based on a similarity metric between synthetic data and reformatted data. In some embodiments, step 416 may include implementing a trained model to generate synthetic data by providing reformatted data as input to the trained model.

At step 418, data-formatting system 102 may display a probabilistic graph of conditional probabilities, consistent with disclosed embodiments. A probabilistic graph may include a probabilistic graph of a Bayesian network, a Markov network, or other types of probabilistic graphs. Probabilistic graphs are described in greater detail below (FIG. 5).

At step 420, data-formatting system 102 may generate, based on conditional probabilities, an expression for determining and/or reformatting data, consistent with disclosed embodiments. An expression may include a regex expression to determine a data format. As a non-limiting example, data-formatting system 102 may determine a data format of ddd-ddd-dddd at step 414 and, at step 420, generate the regex expression comprising the pattern \d{3}-\d{3}-\d{4} which is configured to accept a data value sequence as an input and returns a value of TRUE if the data value sequence is comprised of three digits followed by a first hyphen, three more digits, a second hyphen, and four more digits. In some embodiments, step 420 includes automatically generating an expression comprising a read command, a write command, an insert command, a truncate command, a prepend command, an append commend, and/or a regex command, consistent with disclosed embodiments.

Figure 5:
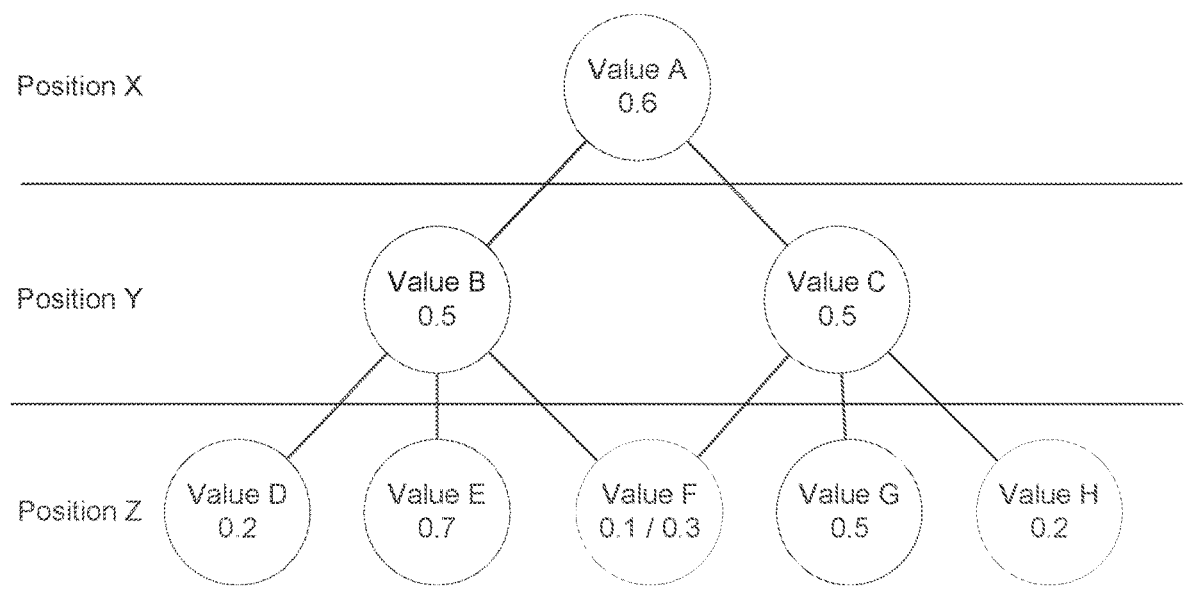
FIG. 5 illustrates an exemplary probabilistic graph, consistent with disclosed embodiments.

FIG. 5 illustrates exemplary probabilistic graph 500, consistent with disclosed embodiments. Probabilistic graph 500 is provided for purposes of illustration only and is not limiting on the embodiments. It should be understood that the embodiments may include other probabilistic graphs not depicted in FIG. 5. For example, although architectures of FIG. 5 may depict a certain number and arrangement of data values, it should be understood that embodiments consistent with the present disclosure may include architectures with any number and any arrangement of probabilities associated with data values. Embodiments may include probabilistic graphs of Bayesian networks, Markov networks, or other types of probabilistic graphs. Disclosed embodiments may include probabilistic graphs with cyclic, acyclic, tree, and/or other structures.

Referring to probabilistic graph 500, in some embodiments, one or more of values A through H may represent singular data values (such as a digit, a letter, a special character, etc.). In some embodiments, one or more of values A though H may represent subsets of data value sequences or "chunks" of data, such as a three-digit area code. One or more of values A through H may represent a data value type such as a digit, a letter, a special character, etc. It should be understood that values A though H may be unique or may have overlapping values (e.g., Value A and Value B may both be the digit "5" or represent the type "special character"). Positions X, Y, and Z may refer to a first, second, and third position in a data value sequence, or to any other positions.

As depicted in FIG. 5, lines between values A though H indicate a dependency and numbers indicate a conditional probability. For example, Value A may have a conditional probability of occurring at position X equal to 0.6 (60%). Values B and C may each have a conditional probability of occurring at position Y given Value A at position X equal to 0.5 (50%). Values D, E, and F may have a conditional probability of occurring at position Z given value B at position Y equal to 0.2, 0.7, and 0.1, respectively. Values F, G, and H may have a conditional probability of occurring at position Z given value C at position Y equal to 0.3, 0.5, and 0.2, respectively.

Figure 6:
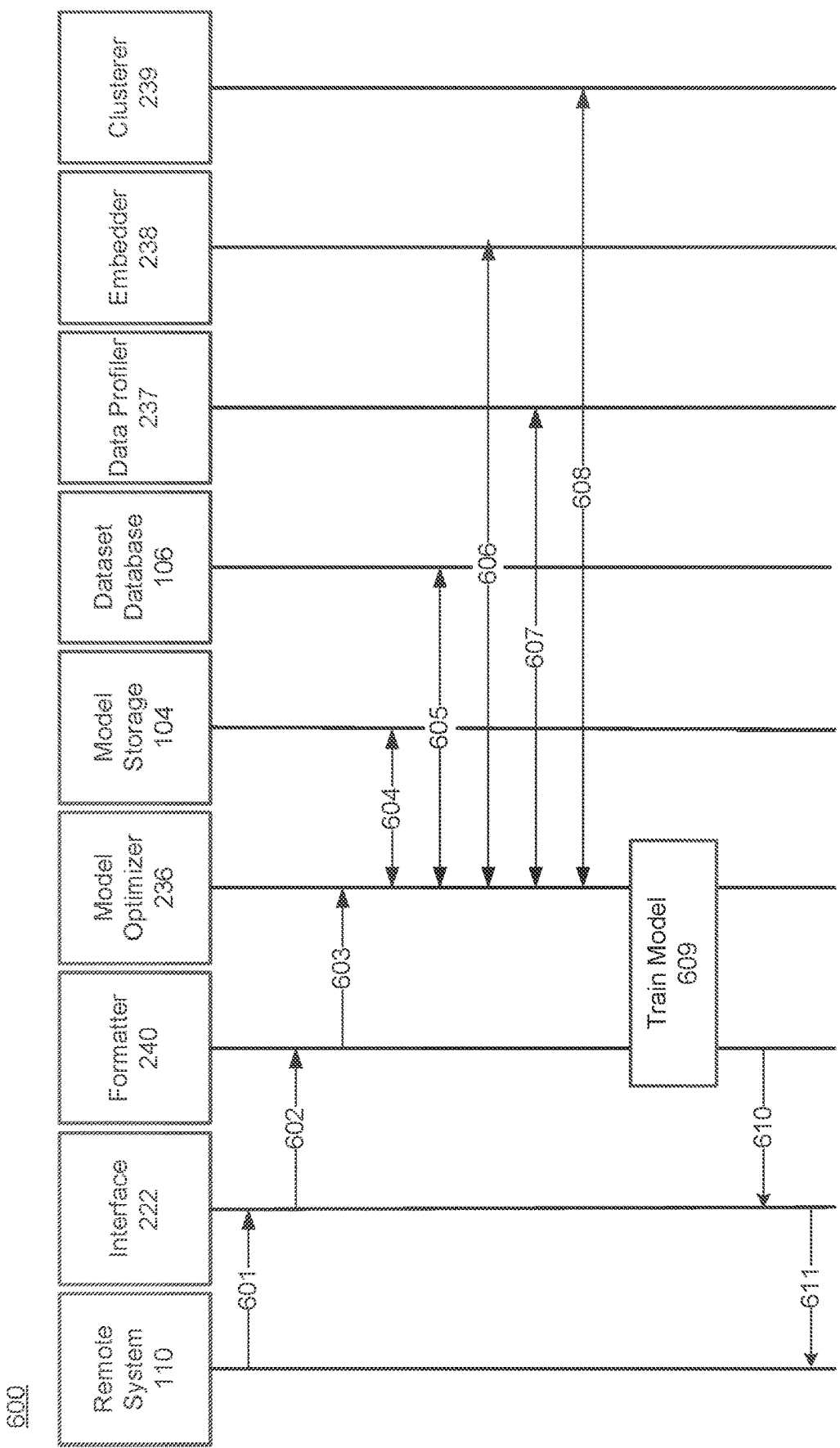
FIG. 6 is a flow chart of an exemplary data formatting process, consistent with disclosed embodiments.

FIG. 6 is a flow chart of an exemplary data formatting process 600, consistent with disclosed embodiments. Process 600 may be performed to determine an unknown data format and/or reformat data.

Although FIG. 6 depicts certain components performing steps of process 600, it should be noted that other components of system 100 may perform operations of one or more steps of process 600. In some embodiments, one or more steps of process 400, process 600, and process 700 may be part of a same process.

Consistent with disclosed embodiments, steps of process 600 may be performed on one or more cloud services using one or more ephemeral container instances (e.g., AMAZON LAMBDA). For example, at any of step of process 600, data-formatting system 102 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 601, remote system 110 may transmit data comprising data value sequences to interface 222 of data-formatting system 102, consistent with disclosed embodiments. In some embodiments, step 601 includes transmitting a request to determine a data format and/or reformat data. A request may identify a desired data format. At step 602, interface 222 may transmit received data to formatter 240.

At step 603, formatter 240 may send a command to model optimizer 236. The command may be based on received data. The command may include an instruction to retrieve a model and/or train a model configured to determine conditional probabilities and/or configured to determine a data format based on conditional probabilities. In some embodiments, formatter 240 may identify a type of data value sequence present in received data and transmit the identified type to model optimizer at step 603.

At step 604, model optimizer may retrieve a model from data storage, the retrieving being based on the command of step 603. Retrieving a model may be based on a type of data sequence and/or a request of step 601.

At step 605, model optimizer 326 may retrieve a training dataset comprising data value sequences. For example, step 601 or 603 may identify a type of data value sequence (e.g., phone numbers) and step 605 may include retrieving data associated with the identified type of data value sequence.

At step 606, model optimizer 236 may send a command to embedder 238 to generate embedded and/or encoded data, consistent with disclosed embodiments. At step 606, embedder 238 may generate embedded and/or encoded data based on received data. At step 606, embedder 238 may return embedded and/or encoded data to model optimizer 236.

At step 607, model optimizer 236 may send a command to data profiler 237 to generate one or more data profiles using training data and/or received data. At step 607, data profiler 237 may generate one or more data profiles based on received data, embedded data, encoded data, consistent with disclosed embodiments.

At step 607, data profiler 237 may return the generated data profiles to model optimizer 236.

At step 608, model optimizer 236 may send a command to clusterer 239 to generate one or more data clusters. At step 607, data profiler may generate one or more data clusters and return the generated data profiles to model optimizer 236.

It should be understood that steps 606 through 608, like other steps of process 600, may be repeated any number of times and/or may be performed in any order.

At step 609, formatter 240 may train a model to determine a data format. Step 609 may include implementing steps of process 400, including generating conditional probabilities and training a model to determine a data format based on conditional probabilities. Step 609 may include coordinating model training with model optimizer 236, consistent with disclosed embodiments. Step 609 may include implementing a model to determine a data format and/or reformatting data. In some embodiments, step 609 may include generating, based on conditional probabilities, an expression for determining and/or reformatting data, consistent with disclosed embodiments.

At step 610, data formatter 240 may transmit a data format, reformatted data, an expression for determining a data format, and/or an expression for reformatting data to interface 222, consistent with disclosed embodiments.

At step 611, interface 222 may transmit a data format, reformatted data, an expression for determining a data format, and/or an expression for reformatting data to remote system 110, consistent with disclosed embodiments.

Figure 7:
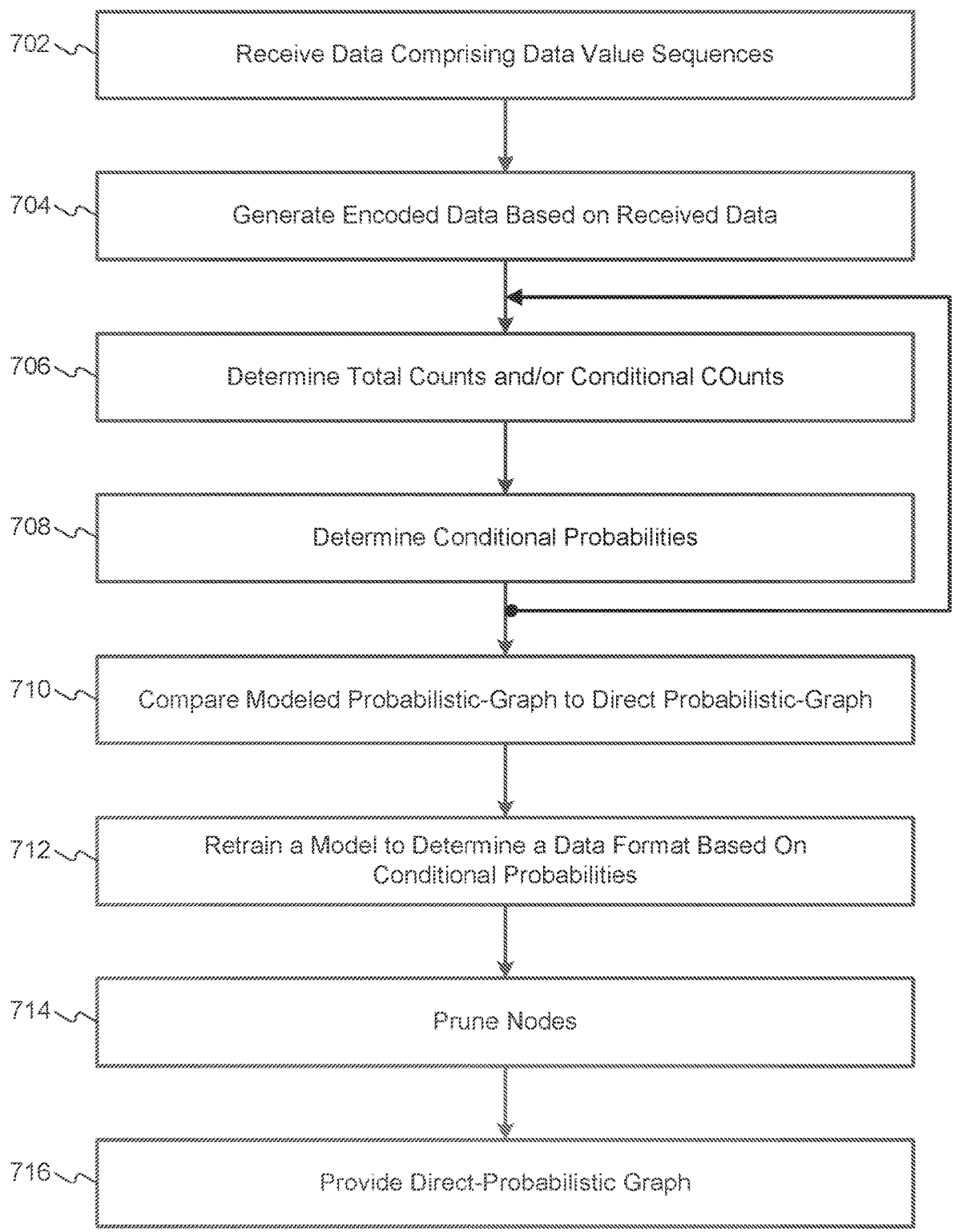
FIG. 7 is a flow chart of an exemplary direct data-formatting process, consistent with disclosed embodiments.

FIG. 7 is a flow chart of an exemplary direct data-formatting process 700, consistent with disclosed embodiments. Process 700 may be performed to determine an unknown data format, to reformat data, and/or to validate a machine learning model trained to generate conditional probabilities.

Although FIG. 7 depicts certain components performing steps of process 700, it should be noted that other components of system 100 may perform operations of one or more steps of process 600.

In some embodiments, one or more steps of process 400, process 600, and process 700 may be part of a same process. For example, method 700 may be performed at step 410 to generate conditional probabilities for a skipped data value. Additionally or alternatively, process 700 may be performed to validate a model by comparing a direct probabilistic-graph of process 700 to a modeled probabilistic-graph generated by a machine learning model (e.g., a probabilistic graph generated by process 400 and/or 600).

Consistent with disclosed embodiments, steps of process 700 may be performed on one or more cloud services using one or more ephemeral container instances (e.g., AMAZON LAMBDA). For example, at any step of process 700, data-formatting system 102 may generate (spin up) an ephemeral container instance to execute a task, assign a task to an already-running ephemeral container instance (warm container instance), or terminate a container instance upon completion of a task. As one of skill in the art will appreciate, steps of process 700 may be performed as part of an application interface (API) call.

At step 702, data-formatting system 102 may receive data comprising data value sequences, consistent with disclosed embodiments (e.g., as described in reference to step 402 and/or step 601, above).

At step 704, data-formatting system 102 may encode received data, consistent with disclosed embodiments. For example, character data may be represented as the following character types: digits may be represented as "d", alphabet characters represented as "a", and punctuation represented may be represented as "p", and/or another character type may be represented as "o." In the example, a sequence 1-12 would be encoded as "dpdd."

As shown in FIG. 7, steps 706 through 708 may be performed iteratively to generate a direct probabilistic-graph using a direct method, consistent with disclosed embodiments. For example, steps 706 through 708 may begin at a node of a direct probabilistic-graph and calculate subsequent nodes of a direct probabilistic-graph, the nodes organized to correspond to positions in data-value sequences (e.g., as depicted in FIG. 5). Steps 706 and 708 may be iteratively performed for all data value sequences (or encoded data value sequences) in a dataset or for a subset of data value sequences (e.g., skipped data value sequences of step 410).

At step 706, for a node in a direct probabilistic-graph, data-formatting system 102 may determine total counts and/or conditional counts of occurrences of data values and/or encoded data values based on received data and/or encoded data. For example, data-formatting system 102 may determine a conditional count by counting instances of a character based on a previous character (or counting instances of a type of character based on a previous type). A total count may include a total of a character in a plurality of data-value sequences, consistent with disclosed embodiments.

At step 708, for a node in a direct probabilistic-graph, data-formatting system 102 may determine conditional probabilities, consistent with disclosed embodiments. A conditional probability may be determined by counting the number of occurrences of a condition and dividing by a total count (e.g., counting occurrences of the data-value sequence "101" at a position in a larger sequence and dividing by a count of all three-digit data-value sequences observed in the position). As shown, step 706 to 708 may be repeated to generate a direct probabilistic-graph, consistent with disclosed embodiments. A direct probabilistic-graph may include a plurality of nodes associated with positions in a data-value sequence and probabilities of occurrence (e.g., as in FIG. 5). In the example of encoding character data as "d," "p," "a," and "o", at a node at one position may split into four other nodes in the next position for a plurality of positions in a direct probabilistic-graph. In this example, a max number of nodes may be $N=(k*L-1)/(k-1)$ where $L=k^h$ nodes in a direct probabilistic-graph, k is a number of positions in a data value sequence, and h is a number of possible data value types.

At step 710, data-formatting system 102 may compare a modeled probabilistic-graph to a direct probabilistic-graph (i.e., a probabilistic graph generated according to process 700), consistent with disclosed embodiments. In some embodiments, at step 710, data-formatting system 102 may generate a modeled probabilistic-graph by performing steps of process 600 and/or 400. In some embodiments, at step 710, data-formatting system 102 may receive or retrieve a previously-generated modeled probabilistic-graph.

Comparing a modeled probabilistic-graph to a direct probabilistic-graph may include determining a match percentage (e.g., a measure of a number of nodes which are include the same conditional probabilities in both a modeled probabilistic-graph and a direct probabilistic-graph). Comparing a modeled probabilistic-graph to a direct probabilistic-graph may include determining a similarity metric that measures similarities between conditional probabilities in a modeled probabilistic-graph and a direct probabilistic-graph. A similarity metric may include a percent overlap, an average relative difference between nodes, a measure of a statistical distribution of differences between nodes, and/or any other similarity metric.

At step 712, data-formatting system 102 may retrain a model associated with a modeled probabilistic-graph based on a comparison between a modeled probabilistic-graph and a direct probabilistic-graph, consistent with disclosed embodiments. For example, data-formatting system 102 may retrain a model based on a similarity metric (e.g., according to threshold). Retraining a model at step 712 may include performing steps of process 400 and/or 600. Retraining a model may include training a model to determine a data format based on conditional probabilities, consistent with disclosed embodiments. Accordingly, step 712 may be performed to validate a machine learning model trained to generate conditional probabilities.

At step 714, nodes may be "pruned," consistent with disclosed embodiments. Pruning a node may include deleting data associated with a node. For example, pruning may include deleting conditional probabilities that are null values (i.e., no occurrences) and/or deleting low conditional probability values (e.g., values below a threshold). Pruning may be performed to decrease memory use associated with a probabilistic graph.

At step 716, a direct probabilistic-graph may be provided, consistent with disclosed embodiments. Providing a direct probabilistic-graph may include storing a direct probabilistic-graph in a data storage (e.g., data storage 231, dataset database 106, and/or remote database 108). Providing a direct probabilistic-graph may include transmitting a direct probabilistic-graph to another computing system (e.g., remote system 110).

Systems and methods disclosed herein involve unconventional improvements over conventional approaches to formatting data. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for formatting data, the system comprising:
at least one memory storing instructions; and
one or more processors configured to execute the instructions to perform operations comprising:
  generating a first probabilistic graph, the first probabilistic graph including a set of nodes corresponding to positions in received data value sequences, by iteratively:
    determining conditional counts of occurrences of received data values at a subsequent node in the set of nodes, the conditional counts being based on counting instances of received data values at one or more preceding nodes in the set of nodes; and
    determining conditional probabilities based on the conditional counts;
  determining a similarity metric of a second probabilistic graph and the first probabilistic graph, the second probabilistic graph being generated by a machine learning model; and
  training the machine learning model based on the similarity metric.

2. The system of claim 1, wherein the operations further comprise classifying the received data value sequences.

3. The system of claim 2, wherein classifying the received data value sequences includes clustering one or more datasets.

4. The system of claim 2, wherein classifying the received data value sequences is based on at least one of a data profile, a data schema, a statistical profile, a foreign key, or a relationship between datasets.

5. The system of claim 1, wherein the operations further comprise training the machine learning model to generate synthetic data to replace sensitive information.

6. The system of claim 1, wherein the operations further comprise determining at least one data schema of the received data value sequences.

7. The system of claim 1, wherein the operations further comprise determining one or more foreign keys within the received data value sequences.

8. The system of claim 1, wherein the operations further comprise determining at least one data format associated with the received data value sequences.

9. The system of claim 8, wherein the operations further comprise reformatting additional data according to the determined at least one data format.

10. The system of claim 1, wherein:
the operations further comprise generating embedded data based on the received data value sequences; and
training the machine learning model comprises using the embedded data as training data.

11. The system of claim 10, wherein generating the embedded data comprises implementing at least one of a one-hot encoding method or a glove method.

12. The system of claim 10, wherein the operations further comprise clustering the generated embedded data and training the machine learning model comprises using clustered embedded data as training data.

13. The system of claim 10, wherein determining the conditional counts of data values is further based on the embedded data.

14. The system of claim 1, wherein determining the conditional probabilities is further based on relationships between nonconsecutive data values in the received data value sequences.

15. The system of claim 1, wherein the machine learning model is a recurrent neural network.

16. The system of claim 15, wherein the operations further comprise training the recurrent neural network to learn a relationship between sub-sequences in the received data value sequences.

17. The system of claim 1, wherein the operations further comprise pruning the first probabilistic graph, the pruning comprising of deleting a null value conditional probability of a node.

18. The system of claim 1, wherein the operations further comprise pruning the first probabilistic graph, the pruning comprising of deleting data associated with a node.

19. A method for formatting data, comprising:
generating a first probabilistic graph, the first probabilistic graph including a set of nodes corresponding to positions in received data value sequences, by iteratively:
  determining conditional counts of occurrences of received data values at a subsequent node in the set of nodes, the conditional counts being based on counting instances of received data values at one or more preceding nodes in the set of nodes; and
  determining conditional probabilities based on the conditional counts;
determining a similarity metric of a second probabilistic graph and the first probabilistic graph, the second probabilistic graph being generated by a machine learning model;
generating embedded data based on the received data value sequences; and
training the machine learning model based on the similarity metric and the embedded data.

20. A non-transitory computer-readable medium including instructions that are executable by one or more processors to perform operations comprising:
- generating a first direct probabilistic-graph, the first probabilistic graph including a set of nodes corresponding to positions in received data value sequences, by iteratively:
  - determining conditional counts of occurrences of received data values at a subsequent node in the set of nodes, the conditional counts being based on counting instances of received data values at one or more preceding nodes in the set of nodes; and
  - determining conditional probabilities based on the conditional counts;
- determining a similarity metric of a second probabilistic graph and the first probabilistic graph, the second probabilistic graph being generated by a machine learning model; and
- training the machine learning model based on the similarity metric.

* * * * *